Figure 1:
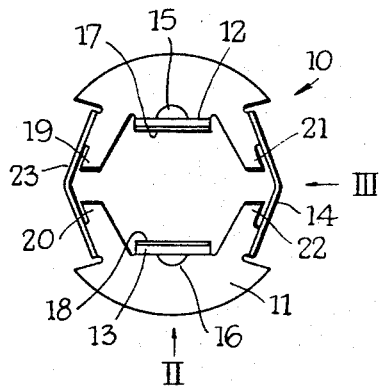

Nov. 22, 1966   C. A. SECKERSON   3,287,036
FASTENERS
Filed Jan. 28, 1964   2 Sheets-Sheet 1

INVENTOR
Clifford Alexander Seckerson
by Walter S. Jones
Attorney.

Nov. 22, 1966 C. A. SECKERSON 3,287,036
FASTENERS

Filed Jan. 28, 1964 2 Sheets-Sheet 2

INVENTOR
Clifford Alexander Seckerson
by Walter S. Jones
Attorney.

United States Patent Office 3,287,036
Patented Nov. 22, 1966

3,287,036
FASTENERS
Clifford Alexander Seckerson, Iver Heath, England, assignor to United-Carr Incorporated, a corporation of Delaware
Filed Jan. 28, 1964, Ser. No. 340,741
Claims priority, application Great Britain, Jan. 31, 1963, 4,090/63
1 Claim. (Cl. 287—20)

The present invention relates to an improved fastener which is particularly although not exclusively suitable for attaching a door handle shaft rotatably within an aperture in a door panel.

According to the invention there is provided a fastener of resilient material having a substantially flat body, an aperture in the body for reception of a shaft, a pair of lugs which are bent upwardly from the body, are disposed on opposite sides of the aperture and each of which is formed with an inwardly directed projection for engagement against the shaft and with an outwardly directed projection which is spaced from the body, two pairs of spaced resilient tongues sheared from the body and between each of which a pin may be engaged and at least one upstanding flange on the body.

According to a further aspect of the invention there is provided an assembly of a shaft rotatably secured in an aperture in a panel with the aid of a bearing and a fastener as defined in the preceding paragraph, in which the bearing comprises a collar and a pair of integral diametrically arranged pins, the pins are engaged between the spaced pairs of resilient tongues in the body of the fastener, the lugs extend through the aperture in the panel, the rim of which is located between the body of the fastener and the outwardly directed projections on the lugs and is shaped to co-operate with the flange on the body of the fastener to prevent rotation of the fastener in the aperture, the shaft extends through the bearing and the aperture in the body of the fastener and the inwardly directed projections on the lugs are engaged in a circumferential groove in the shaft to prevent axial movement of the shaft through the aperture in the panel, the arrangement being such that the shaft holds the lugs outwardly in engagement with the rim of the aperture in the panel to prevent withdrawal of the fastener from the aperture.

According to yet a further aspect of the invention there is also provided a door lock comprising an assembly as defined in the preceding paragraph, wherein the shaft is stepped and includes a projection of non-circular cross section operatively engaged in the lock mechanism, the cylindrical portion of the shaft includes two diametrically positioned axial grooves extending from the circumferential groove to the end thereof, rotation of the shaft with respect to the fastener is limited by the stops in the lock mechanism, the shaft is adapted to be inserted through the fastener so that the lugs ride in the axial grooves and to be rotated so that the lugs lock in the circumferential groove and the lock mechanism is adapted to limit rotation of the shaft to prevent the lugs coming into alignment with the axial grooves.

Figure 2:
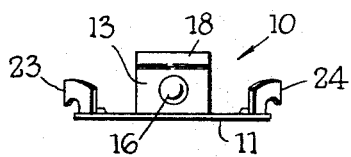
Figure 3:
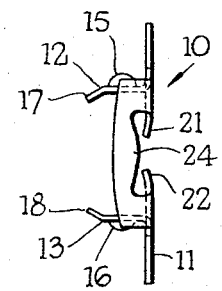
Figure 4:
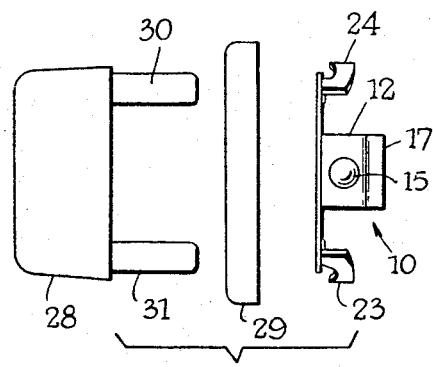
Figure 6:
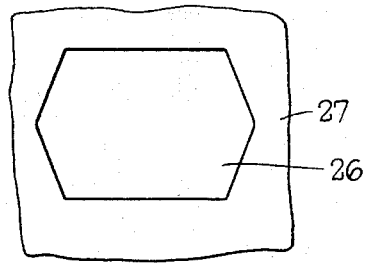
Figure 5:
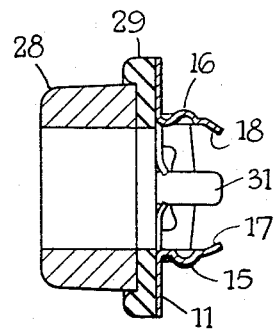

Preferred forms of the invention will now be described with reference to the accompanying diagrammatic drawings, in which:

FIGURE 1 is a rear elevation of a fastener,
FIGURE 2 is an edge view of the fastener taken in the direction of the arrow II, FIGURE 1,
FIGURE 3 is an edge view of the fastener taken in the direction of the arrow III, FIGURE 1,
FIGURE 4 is an exploded plan view of the fastener of FIGURES 1 to 3, a rubber washer and a door handle bearing,
FIGURE 5 is a sectional elevation showing the parts of FIGURE 4 assembled together,
FIGURE 6 is a front elevation of an aperture in a panel suitable for the reception of the fastener of FIGURES 1 to 3,
FIGURES 7 and 8 are respectively a sectional elevation through the panel of FIGURE 6 and a rear elevation showing a door handle shaft secured rotatably within the aperture in the panel with the aid of the fastener of FIGURES 1 to 3,
FIGURE 9 is an elevation showing a detail of the door handle shaft of FIGURES 7 and 8,
FIGURES 10 and 11 are views similar to FIGURES 2 and 3 of a modification of the fastener of FIGURES 1 to 3, and
FIGURE 12 is a view similar to FIGURE 3 of a further modification of the fastener of FIGURES 1 to 3.

In FIGURES 1 to 3 a fastener is indicated generally at 10 which is preferably formed from steel and is rendered resilient and preferably rustproof after being sheared and bent to the shape shown.

The fastener 10 comprises a flat substantially circular body 11 from the centre of which two lugs 12 and 13 are sheared and bent upwardly to the same side thereof leaving a central aperture 14.

Each lug 12 and 13 is formed with an outwardly directed projection intermediate its length, comprising dimples 15 and 16 respectively and has its free end 17 and 18 respectively, bent inwardly to form an inwardly directed projection.

Two pairs of spaced resilient tongues 19, 20 and 21, 22 are sheared and bent up from the body 11 on the same side thereof as the lugs 12 and 13 so as to provide two pin engaging fastenings one on each side of the aperture 14.

Flanges 23 and 24 are sheared and bent up from the body adjacent the pairs of tongues 19, 20 and 21, 22 respectively.

The flanges 23 and 24 are diametrically opposed with respect to the body 11 and are both bent intermediate their length so as to be outwardly convex and of shallow V-shape.

The aperture 14 is substantially symmetrical about a centre point and has the lugs 12 and 13 arranged at the opposite ends of one diameter and the two pairs of tongues 19, 20 and 21, 22 arranged at opposite ends of a second diameter which is perpendicular to the first.

The lugs 12 and 13, the tongues 19, 20 and 21, 22 and the flanges 23 and 24 are all bent upwardly to the same side of the body 11.

Figure 7:
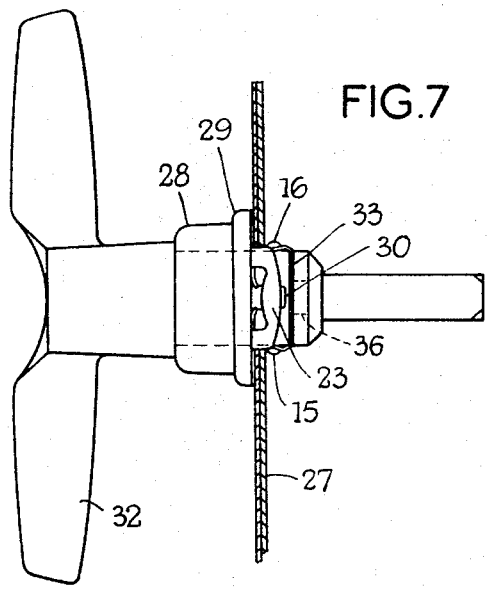
Figure 8:
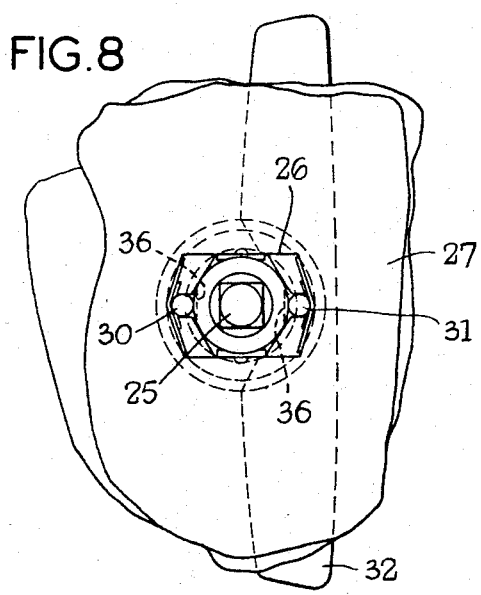

The fastener 10 is used, as shown in FIGURES 7 and 8 to secure a door handle shaft 25 within an aperture 26 in a panel 27.

In order to attach the shaft 25 in the aperture 26 a bearing member 28 and rubber washer 29 are first engaged to the fastener as shown in FIGURES 4 and 5.

The bearing 28 comprises a collar and two integral pins 30 and 31 which are passed through holes provided in the washer 29 and then pressed home between the resilient tongues 19, 20 and 21, 22 respectively. The tongues prevent withdrawal of the pins 30 and 31 and the rubber washer 29 is thus trapped and compressed between the collar and the body of the fastener.

The sub-assembly of the fastener, bearing and washer is then mounted in the aperture 26 by pressing the lugs 12 and 13 through the aperture until the dimples 15 and 16 snap-engage behind the panel to secure the sub-assembly thereto. It will be seen that the aperture 26 is hexagonal and the V-shaped flanges 23 and 24 of the fastener are adapted to seat in opposite corners of the aperture 26 and prevent rotation of the sub-assembly within the aperture.

The shaft 25, to which a door handle 32 is attached in a conventional manner is then passed through the bearing 28 and between the lugs 12 and 13 of the fastener until the inwardly directed free ends 17 and 18 of the lugs snap-engage into a circumferential groove 33 provided on the shaft.

The lugs 12 and 13 are held out by the shaft 25 in firm engagement against the rim of the aperture 26 so that the shaft 25 and the door handle 32 are held firmly to the panel 27. The door handle 32 and shaft 25 can then be rotated within the aperture while being held against withdrawal therefrom by the lugs 12 and 13 which are engaged in the groove 33 on the shaft.

When the door handle 32 is assembled in the aperture 26 in the manner described above it cannot be disassembled and removed without damaging and distorting the lugs 12 and 13 which are engaged in the groove 33 on the shaft.

In certain applications it may be necessary on occasions to disassemble the handle for instance if it has been damaged and needs replacing.

Figure 9:
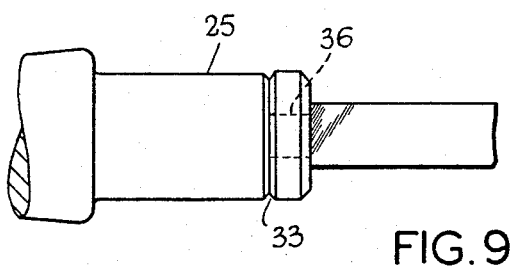

To enable this to be done easily and without damaging the fastener 10 the shaft 25 is formed with two diametrically opposed axial flats 36 which are indicated in broken line in FIGURES 7, 8 and 9.

The axial flats 36 extend from the circumferential groove 33 to the end of the cylindrical portion of the shaft and they are of the same depth as the groove 33.

In order to attach the shaft 25 in the sub-assembly the shaft is aligned and passed through the fastener so that the lugs 12 and 13 ride in the flats 36. When the lugs 12 and 13 are located in the circumferential groove 33 the shaft is rotated so that the flats 36 are carried away from the lugs which thus bear against the outer edge of the groove 33 and prevent withdrawal of the shaft from the sub-assembly.

The lock mechanism, which will be designed to limit rotation of the shaft is then brought up to and fitted over the projecting square section end of the shaft 25.

When the lock is fitted to the shaft and bolted in position the steps in the lock mechanism, which is designed accordingly, prevent the shaft and handle from being rotated back into the position in which the flats 36 are aligned with the lugs 12 and 13 and limit rotation of the shaft in the opposite direction to substantially less than 180° so that the handle cannot be returned into the position in which the flats 36 in the shaft are again aligned with the lugs 12 and 13.

In order to disassembly the door handle the lock is first removed and the shaft is then rotated into the position in which the lugs will ride in the flats 36 allowing the shaft to be withdrawn.

Figure 11:
Figure 10:
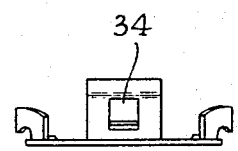

In a modification of the fastener 10, as shown in FIGURES 10 and 11 the dimples 15 and 16 in each lug 12 and 13 respectively is replaced by an outwardly and downwardly directed projection 34 which serves the same purpose as the dimples to retain the fastener within the aperture in the panel.

Figure 12:

In yet a further modification of the fastener 10, as shown in FIGURE 12 each lug 12 and 13 may be formed with a transverse outwardly directed ridge 35 which again serves the same purpose as the dimples 15 and 16 to retain the fastener within the aperture in the panel.

The aperture 26 in the panel 27 may be of rectangular shape in which case the fastener is modified to fit the rectangular aperture by forming the flanges 23 and 24 substantially straight.

What I claim is:

A fastener of resilient material having a substantially flat body, an aperture in the body for reception of a shaft, a pair of lugs, which are bent from one side of said body and are disposed in opposite sides of said aperture and each of which is formed with an inwardly directed terminal end for engagement against the shaft and with an outwardly directed projection spaced from the body and at least two pairs of spaced resilient tongues sheared from said body adjacent to said aperture and each of said pairs of tongues adapted to engage a pin extending therethrough and being joined by upstanding flanges extending from said body, said flanges adapted to engage the wall of an aperture formed in a member to prevent rotation between said fastener and said member.

References Cited by the Examiner

UNITED STATES PATENTS

| | | | |
|---|---|---|---|
| 1,190,664 | 7/1916 | Meleady | 287—20.1 |
| 1,734,971 | 11/1929 | Johnson | 287—20.1 |
| 2,275,773 | 3/1942 | Kost | 151—41.75 |
| 2,719,558 | 10/1955 | Tinnerman | 151—41.75 |
| 3,028,184 | 4/1962 | Knowlton | 287—119 |

CARL W. TOMLIN, *Primary Examiner.*

I. B. TALTON, T. F. CALLAGHAN,
*Assistant Examiners.*